United States Patent [19]

Reynders

[11] Patent Number: 5,287,492

[45] Date of Patent: Feb. 15, 1994

[54] METHOD FOR MODIFYING A FAULT-TOLERANT PROCESSING SYSTEM

[75] Inventor: Paul T. M. Reynders, Deurne, Belgium

[73] Assignee: Alcatel N.V., Amsterdam, Netherlands

[21] Appl. No.: 710,175

[22] Filed: Jun. 3, 1991

[30] Foreign Application Priority Data

Jun. 1, 1990 [EP] European Pat. Off. ........ 90201393.7

[51] Int. Cl.$^5$ ..................... G06F 11/20; G06F 15/40
[52] U.S. Cl. ................... 395/575; 371/68.3; 371/5.4; 371/9.1
[58] Field of Search .......... 371/68.3, 9.1, 5.5, 371/5.4; 364/187, 268.3, 268.9, 269; 395/575

[56] References Cited

U.S. PATENT DOCUMENTS

| | | | |
|---|---|---|---|
| 3,557,315 | 1/1971 | Kobus et al. | 179/15 |
| 3,761,884 | 9/1973 | Avsan et al. | 340/172.5 |
| 3,810,119 | 5/1974 | Zieve et al. | 371/68.3 |
| 3,833,798 | 9/1974 | Huber et al. | 371/68.3 |
| 4,198,678 | 4/1980 | Maatje et al. | 371/68.3 |
| 4,569,017 | 2/1986 | Renner et al. | 364/200 |
| 4,797,884 | 1/1989 | Yalowitz et al. | 364/187 |
| 4,945,486 | 7/1990 | Nitschke et al. | 371/68.3 |

FOREIGN PATENT DOCUMENTS

| | | |
|---|---|---|
| 903117 | 8/1985 | Belgium . |
| 0236780 | 9/1987 | European Pat. Off. . |
| 1269827 | 6/1968 | Fed. Rep. of Germany . |

Primary Examiner—Robert W. Beausoliel, Jr.
Assistant Examiner—Albert Decady
Attorney, Agent, or Firm—Robbins, Berliner & Carson

[57] ABSTRACT

A method for modifying a fault-tolerant processing system (FTS) including a pair of partner sets of two processors (PA1/PA2; PB1/PB2) operating in microsynchronization at a first or low processing frequency (FL) and connected to a respective system bus (BA; BB) operating at a bus clock frequency (FB) lower than the first processing frequency (FL). The method consists in:

- selecting the system bus (BA) associated to one of the sets of "slow" processors (PA1/PA2);
- replacing the other set of "slow" processors (PB1/PB2) by a set of "fast" processors (PB1'/PB2');
- synchronizing the operation of the remaining "slow" set with that of the "fast" set by:
  - executing by each set (PA1/PA2; PB1'/PB2') one processor cycle during a first cycle (T1) of the bus clock frequency (FB) and generating a synchronization signal (SA1; SB1) at the end of this first bus clock cycle;
  - executing during each following bus clock cycle (T2-T6) an additional processor cycle and generating a synchronization signal (SA1; SB1) until one of the sets, i.e. the slowest, fails to generate the latter synchronization signal.

In case of upgrading of the system, similar steps are executed for replacing the remaining slow set (PA1/PA2) by another set of fast processors (PA1'/PA2').

22 Claims, 2 Drawing Sheets

METHOD FOR MODIFYING A FAULT-TOLERANT PROCESSING SYSTEM

TECHNICAL FIELD

The present invention relates to a method for modifying a fault-tolerant processing system including a pair of first and second partner sets of processors operating in microsynchronization at a first processing frequency and connected to a respective one of two system busses, both the system busses operating with a same bus clock signal having a same predetermined bus clock frequency relatively lower than said first processing frequency.

BACKGROUND ART

Such a fault-tolerant processing system is already known in the art, e.g. from the general information pamphlet of "STRATUS—CONTINUOUS PROCESSING" published by "Stratus Computer, Inc.", 55 Fairbanks Boulevard, Marlboro, Mass. 01752, USA. Therein is disclosed a fault-tolerant computer with a printed circuit board carrying duplicated components, say a set of processors. Each board is further duplicated to provide together with the other board a pair of partner sets of processors, the four processors operating simultaneously with the same data. Furthermore, on each processor board the results of the operations of the two processors thereof are permanently compared. If a processor fails, i.e. when the results do not match, the system continues its processing with the set of processors of the other (partner) processor board without missing a step and with no degradation of performance, the processor board carrying the failing component being immediately removed from service, i.e. the faulty processor board is disconnected from the system.

The present invention more particularly relates to a method which consists in replacing at least said second set of processors by a third set of processors operating at a second processing frequency relatively higher than said bus clock frequency.

When, e.g. as a result of a failing processor, a processor board has to be replaced in the fault-tolerant processing system, it may occur that a new identical processor board is not immediately available. In that case it may be useful to allow the system to operate, at least temporarily, with a compatible processor board, e.g. carrying a set of processors of another type and which operate at another or second processing frequency.

A problem to modify in this way the hardware configuration of the system is that the two sets of processors have to operate in the same way as the above pair of partner sets of processors, i.e. in microsynchronization, to obtain a fault-tolerant processing system. This microsynchronization gives rise to a complex microsynchronization of the processing clock especially when it has to be done in a "non-stop" (on-line) environment, i.e. without interrupting the operation of the system.

DISCLOSURE OF THE INVENTION

An object of the present invention is to provide a method for modifying such a known fault-tolerant processing system with a minimum degradation of its performance and without interrupting its operation.

According to the invention this object is achieved due to the fact that said method includes the steps of:

selecting a first system bus associated to said first set of processors;

replacing in said system said second set of processors by said third set of processors; and synchronizating the operation of said first set of processors with that of said third set of processors by executing during a bus clock cycle of said bus clock signal a same predetermined number of processor cycles by said first set on said first system bus at said first processing frequency and by said third set on said second system bus at said second processing frequency.

In this way, the first and the third sets of processors operate in microsynchronization as a pair of partner sets of processors and the operation of the fault tolerant processing system is not interrupted.

It is to be noted that a fault-tolerant system is also known from the U.S. Pat. No. 3,557,315 (S. Kobus et al 19-4-1-2-13). Therein it forms part of a communication system and is provided with two programmed processors which are used on a load-sharing basis and continuously inform one another about the characteristic phases of the operations performed. In case one of the processors operates faulty, the correctly operating processor is able to take over the already started operations of the faulty processor. However, this other known fault-tolerant system needs a switch-over time during which the processing is interrupted. Such an interruption has to be avoided in communication systems.

Also, according to the present invention, said synchronization of the operation of said first set of processors on said first system bus with that of said third set of processors on said second system bus includes the steps of:

executing during a first bus clock cycle of said bus clock signal on said first system bus and by said first set at said first processing frequency, a first predetermined number of processor cycles and then generating a first synchronization signal, while executing during said first bus clock cycle on said second system bus and by said third set at said second processing frequency, said first predetermined number of processor cycles and then generating a second synchronization signal;

executing during each following bus clock cycle on said first system bus and by said first set at said first processing frequency, another predetermined number of processor cycles equal to the number of processor cycles executed during the preceding bus clock cycle increased by a second predetermined number of processor cycles and then generating a said first synchronization signal, while executing during said following bus clock cycles on said second system bus and by said third set at said second processing frequency, said other predetermined number of processor cycles and then generating a said second synchronization signal; and continue until either a said first or a said second synchronization signal fails to be generated during a bus clock cycle.

The operation speed of the system is thus gradually brought to the highest common processing frequency amongst the first and the second processing frequencies with a minimum degradation of the performance of the system and without any interruption of the operation of the latter. Moreover, because a same number of processor cycles is executed by each set of processors during a same bus clock cycle, the microsynchronization between these sets is permanently ensured.

It is to be noted that a synchronization of the operation speed of processors is already known from the Belgian patent BE-903,117 (H. Mack et al 1-12). Therein, three computers or processors are synchronized by interrupt signals. More in detail, when the fastest processor reaches an interrupt point of its program, it sends an interrupt signal to the two other processors and waits. The two other processors continue executing their program until the next interrupt point thereof, this next interrupt point corresponding to the one reached by the fastest processor. When the two other processors both have attained their interrupt point and consequently have issued an interrupt signal the three processors are restarted in synchronism upon receipt of the next following interrupt signal in their programs.

A drawback of this know synchronization method is that the programs of the processors need to include interrupt points at predetermined program locations. This means that the existing programs have to be prepared for possible future upgrade of the hardware configuration of the system. It is obvious that this is practically impossible to anticipate, i.e. to insert the interrupt points at appropriate program locations.

Another characteristic feature of the present invention is that when a said synchronization signal fails to be generated during a bus clock cycle on a said system bus, both said partner sets of processors execute during the following bus clock cycles a number of processor cycles equal to said other predetermined number of processor cycles less one.

In this way, during all the bus clock cycles following the one during which the generation of synchronization signal has failed, the first and third sets of processors operate in synchronization at the speed of the slowest one of these two sets of processors, i.e. at lowest processing frequency amongst the first and the second ones.

An important case of modifying a fault-tolerant processing system is to upgrade it by replacing a pair of partner sets of processors by another pair of partner sets of more performant processors, e.g. operating at a higher processing frequency. Because the operation of the system should not be interrupted, only one processor board, i.e. one set of processors, can be changed at a time.

The present invention is further characterized by the fact that said first processing frequency is relatively lower than said second processing frequency.

The above disclosed method may thus be considered as an intermediate phase of such an upgrading operation. Indeed, therein only the second or "slow" set of processors is replaced by the third or "fast" set of processors.

Therefore, the method of the present invention is also characterized in that it further consists in replacing said first set of processors by a fourth set of processors operating at said second processing frequency, and includes the additional steps of:
  selecting said second system bus associated to said third set of processors;
  replacing in said system said first est of processors by said fourth set of processors;
  synchronizing the operation of said fourth set of processors with that of said third set of processors by executing during a bus clock cycle of said bus clock signal a same predetermined number of processor cycles by said fourth set on said first system bus at said second processing frequency and by said third set on said second system bus at said second processing frequency.

In this way it is possible to replace a "slow" pair of partner sets of processors by a "fast" pair of partner sets of more performant processors without interrupting the system.

BRIEF DESCRIPTION OF DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
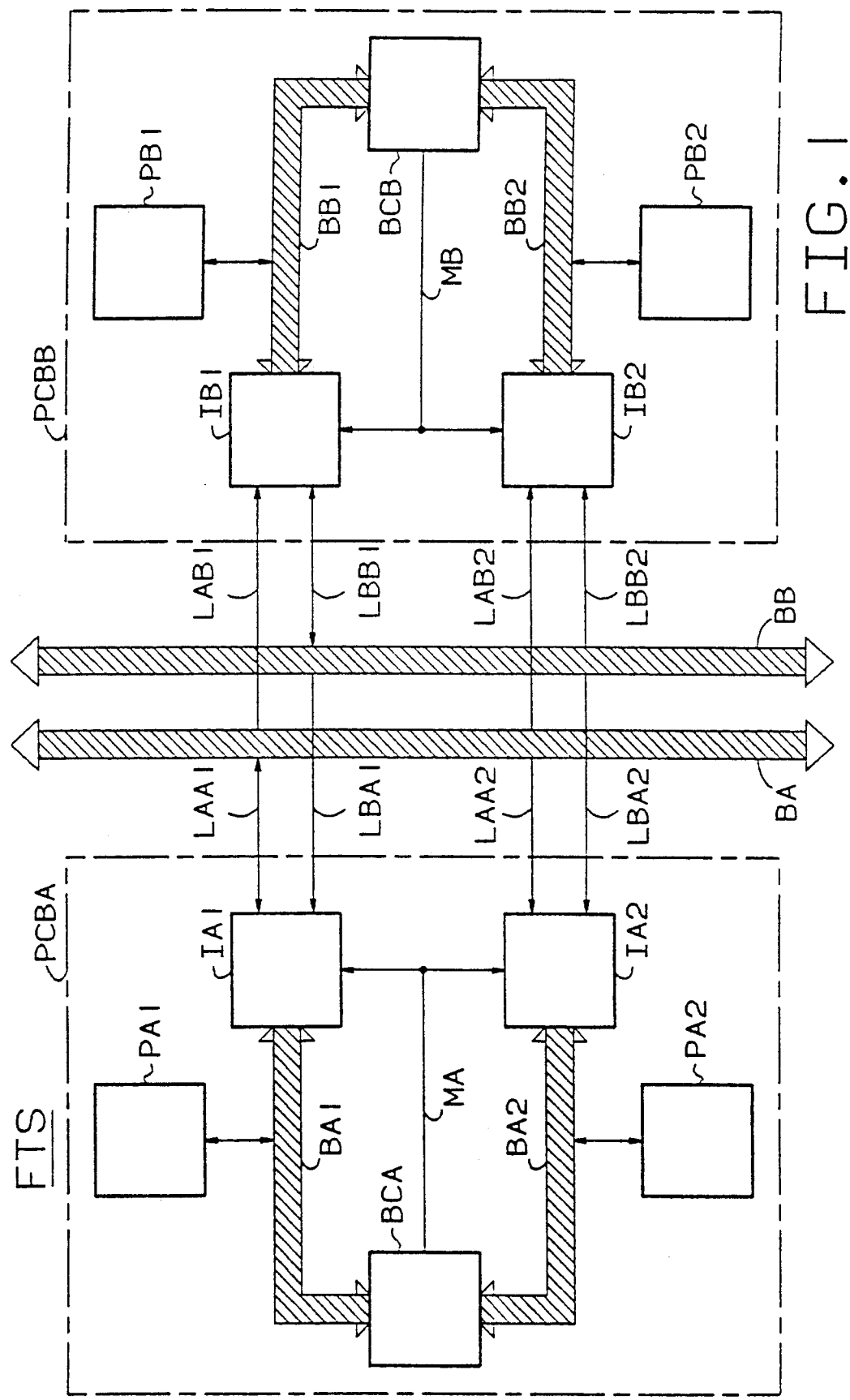
FIG. 1 shows a portion of a fault-tolerant processing system FTS wherein the method according to the invention is used.

The fault-tolerant processing system FTS of which a portion is shown in FIG. 1 and described in more detail hereinafter is an on-line repairable control system used in a broadband-ISDN switching exchange. This portion is the processor unit of FTS and is constituted by two identical subsystems PCBA and PCBB working in microsynchronization, and mounted on respective like named self error detecting printed circuit boards. Indeed, as will become clear from the following description, when an error is detected in one of the subsystems, PCBA or PCBB, the other subsystem continues generating correct results without any interruption. Fault-tolerance thus is achieved without software impact nor any loss in processing throughput.

To increase its performance the system may be upgraded by replacing on-line, i.e. while running, the printed circuit boards PCBA and PCBB and thus also the processors PA1, PA2 and PB1, PB2 located thereon by more efficient ones, e.g. faster ones. A method for modifying and more particularly for upgrading the system FTS will be described in more detail later.

Each of the above subsystems PCBA and PCBB is constituted by a pair of partner processors PA1/PA2 and PB1/PB2, two local Busses BA1/BA2 and BB1/BB2, a local Bus Checker BCA and BCB, and two system bus Interfaces IA1/IA2 and IB1/IB2 respectively. These subsystems PCBA and PCBB are both symmetrically connected to the duplicated system Busses BA and BB also forming part of the system FTS.

It is to be noted that since both the subsystems PCBA and PCBB are identical and perform the same operations, the fault-tolerant system FTS, during its operation, may select and use either one of the two system busses BA or BB.

The system bus BA is bidirectionnally connected via a link LAA1 to the system bus interface IA1, of the subsystem PCBA, which can read information from this system bus BA and/or write information thereto, whilst the system bus BB is unidirectionnally connected via link LBA1 to the system bus interface IA1 which can only read information from this system bus BB. Both the system busses BA and BB are unidirectionnally connected via respective links LAA2 and LBA2 to the system bus interface IA2, of the subsystem PCBA, which can only read information from these busses.

In a similar way, the system bus BB is bidirectionnally connected via a link LBB1 to the system bus interface IB1, of the subsystem PCBB, which can read information from this system bus BB and/or write information thereto, whilst the system bus BA is unidirectionnally connected via a link LAB1 to this system bus interface IB1 which can only read information from this system bus BA. Both the system busses BA and BB are also unidirectionnally connected via respective links LAB2 and LBB2 to the system bus interface IB2, of the subsystem PCBB, which can only read information from these busses.

Because, as already mentioned, the architecture and the operation of both the subsystems PCBA and PCBB are identical, only one of them, say PCBA, will be described in detail below.

Each processor PA1/PA2 is connected to a respective local bus BA1/BA2 which is itself connected to an associated system bus interface IA1/IA2. The two local busses BA1 and BA2 are further connected to the local bus checker BCA. The local bus checker BCA is itself connected to both the system bus interfaces IA1 and IA2 via a Message link MA.

When the fault-tolerant system FTS is running normally, only one of the system busses, say BA, has previously been selected for operation. Moreover, both the processors PA1 and PS2, as well as those of the subsystem PCBB, i.e. PB1 and PB2, are active and perform the same operation. The results of the operations of PA1 and PA2 are loaded on the local busses BA1 and BA2 respectively and compared by the local bus checker BCA. As long as these results are identical the system bus interface IA1 transmits the result of the processor PA1 from the local bus BA1 to the system bus BA via the link LAA1. On the other hand, the system bus interface IA2 reads, via the link LAA2, the data, i.e. the results of PA1, loaded on the system bus BA by the system bus interface IA1 and compares it with the result of the processor PA2 received via the local bus BA2. When the system runs normally, i.e. when these results are equal, no action is taken by the system bus interface IA2.

Additionaly, the system bus interfaces IA1 and IA2 compare the result of the processors PA1 and PA2 with the result of the processor PB1, the latter result being supplied to these system bus interfaces IA1 and IA2 via the local bus BB1, the system bus interface IB1, the link LBB1, the system bus BB and the links LBA1 and LBA2 respectively.

When e.g. due to the failure of a component of the subsystem PCBA, a difference is detected between the result of PA1 and that of PA2, by the local bus checker BCA, an error message is generated by BCA and transmitted to both the system bus interfaces IA1 and IA2 via the message link MA. The system bus interface IA1 then generates an error message which is transmitted to the other constituent parts of the system FTS via the link LAA1 and the system bus BA. Upon receipt of this error message, control means (not shown) connected to the system busses BA and BB select the other system bus, i.e. BB, in order to remove the faulty subsystem PCBA from the fault-tolerant system FTS. In other words, the system FTS continues operating normally with the running subsystem PCBB. This occurs without any degradation of the performance of this system.

It is to be noted that the system bus interfaces IA1 and IA2 further also send an interrupt signal to the processors PA1 and PA2 respectively in order to interrupt the operation thereof.

A procedure similar to the one described above is also followed when the system bus interface IA2 detects a difference between the data received from the system bus BA via the link LAA2 and the result of the processor PA2 received via the local bus BA2.

Finally, the same is also true when either one of the system bus interfaces IA1 and IA2 detects a difference between the data on the system bus BB and the results received from their associated processors PA1 and PA2 respectively.

To fulfil requirements of high reliability and availability, e.g. to obtain a system down time of less than 1 minute per year, one must also be able to change the hardware of the fault-tolerant processing system FTS without interruption of its operation.

An important case of such a change in the hardware consists in upgrading the system FTS by increasing the processing frequency of the processors PA1/PA2 and PB1/PB2, i.e. by replacing these processors by processors PA1'/PA2' (not shown) and PB1'/PB2' (not shown) respectively operating at a higher frequency. Since this must be done "non-stop", i.e. without interruption of the operation, only one subsystem PCBA or PCBB can be replaced at a time.

Figure 2:
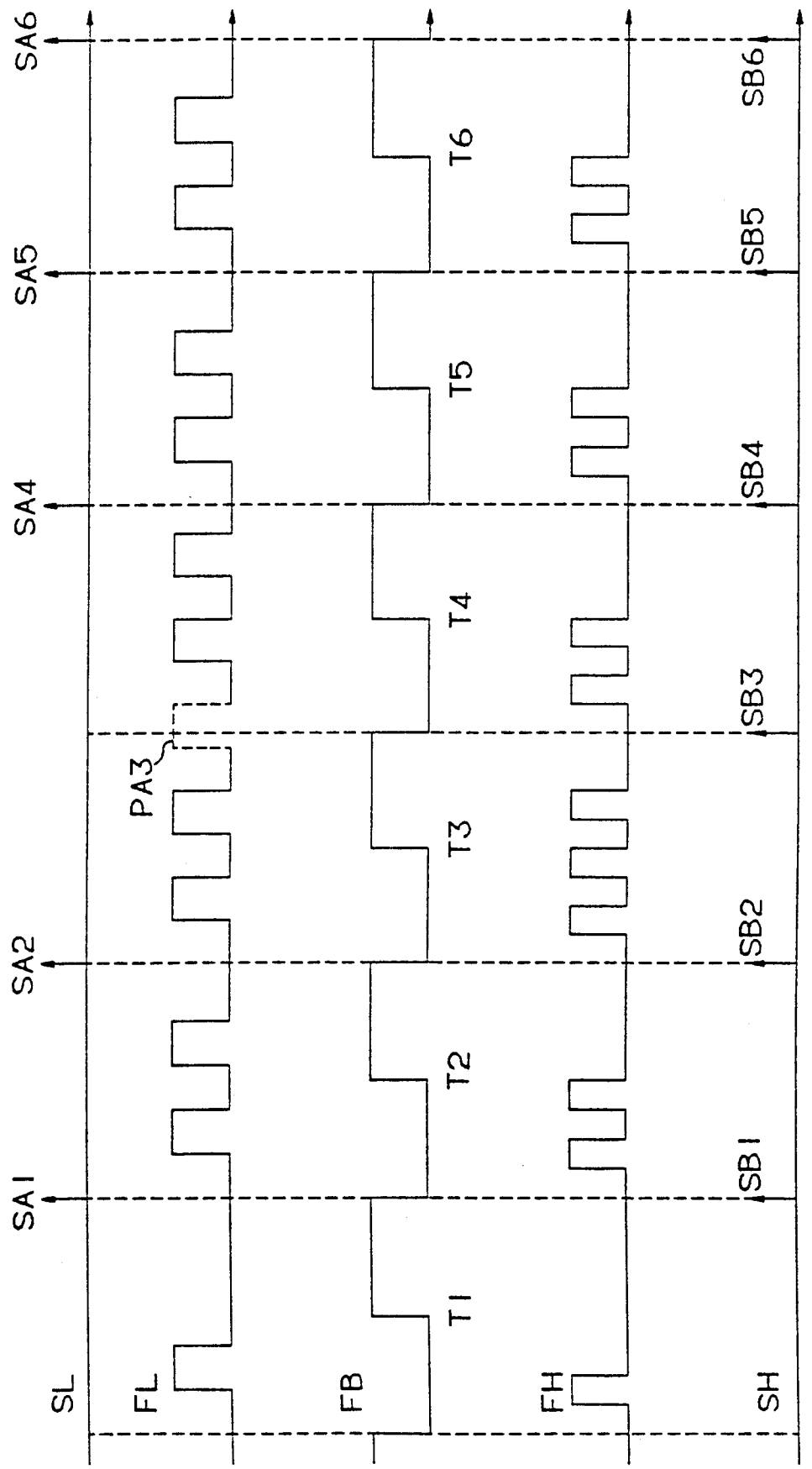
FIG. 2 is a schematic representation (not on scale) of signals used in the system FTS of FIG. 1.

Such a case is analyzed hereinafter by means of an example described a method for replacing the two sets of processors PA1/PA2 and PB1/PB2 running at a processing frequency FL of 25 MHz by two new sets of processors PA1'/PA2' and PB1'/PB2' running at a frequency FH of 33 MHz, the signals at these frequencies FL and FH being shown at FIG. 2.

Hereby it is assumed that the system busses BA and BB operate at a bus clock frequency FB, e.g. of 10 MHz, which is relatively lower than the lowest of the two above frequencies FL and FH. The bus clock signal at the frequency FB is also shown in FIG. 2. The example also explains how the required microsynchronization between the processors is realized.

The method consists in selecting one of the system busses, say BA, thus enabling the operation of the processors PA1 and PA2 of the subsystem located on the printed circuit board PCBA. The other printed circuit board PCBB is then disabled, removed from the system FTS and replaced by a new printed circuit board, say PCBB' (not shown), carrying a subsystem with faster processors PB1' and PB2' (both now shown), i.e. running at the processing frequency FH.

The microsynchronization of the processors PA1/PA2 running at the processing frequency FL with the processors PB1'/PB2' running at the processing frequency FH is realized as follows.

After insertion of the new subsystem PCBB', one of the system bus interfaces thereof, say IB1' (not shown), sends a "restart" signal to the system bus BB and so further to the system bus interfaces IA1 and IA2 of the other subsystem PCBA. Then a procedure is started according to which each of the subsystems PCBA and PCBB' tries to find the processing frequency of its partner. When the lowest frequency is known, the fastest subsystem, here PCBB', will be slowed down to this low processing frequency FL of the slowest subsystem PCBA. The slowing down of the subsystem PCBB' is performed by the system bus interfaces IB1'/IB2' thereof which ∓delete" some processor cycles, also called clock "ticks", from the processing frequency FH of PB1'/PB2' as will become clear below.

During a first bus clock cycle T1 (FIG. 2) of the bus clock signal at the bus clock frequency FB following the above restart signal, the set of processors PA1/PA2 of the subsystem PCBA executes one processor cycle at the processing frequency FL (25 Mhz) and sends at the end of this bus clock cycle T1 a "synchronization" signal SA1 to the system bus BA. During this same bus clock cycle T1, the set of processors PB1'/PB2' of the subsystem PCBB' also executes one processor cycle but at the processing frequency FH (33 Mhz) and at the end of T1 sends a "Synchronization" signal SB1 to the system bus BB.

As long as two synchronization signals SA1 and SB1 are received at the same time by the partner subsystems, i.e. by PCBB' and by PCBA via their system bus interfaces IB1'/IB2' and IA1/IA2 respectively, the number of processor cycles executed during the next following bus clock cycle is increased by one. In other words, during the second bus clock cycle T2 following the restart signal, two processor cycles are executed instead of one by both the sets of processors PA1/PA2 and PB1'/PB2' and the respective synchronization signals SA2 and SB2 are sent to the associated system busses BA and BB respectively at the end of T2. Here again the two synchronization signals SA2 and SB2 are simultaneously sent and received by the partner subsystems PCBA and PCBB' so that the number of processing cycles which will be executed during the following bus clock cycle, i.e. the third bus clock cycle T3 after the restart signal, is equal to three.

In the present example it is supposed that during the third bus clock cycle T3 where three processor cycles have to be executed, the set of processors PA1/PA2 is not able to complete the execution of these three processor cycles during this bus clock cycle. Indeed, the third processor cycle—PA3 on FIG. 2—being not completed when the synchronization signal (SA3 not shown) has to be generated, the subsystem PCBA fails to generate this synchronization signal (SA3) on the system bus BA. In other words, the third processor cycle PA3 overwrites the third synchronization signal SA3. On the other hand the subsystem PCBB' executes the requested three processor cycles within the duration of the bus clock cycle T3 and sends a synchronization signal SB3 to the system bus BB. Because no two synchronization signals are sent, and more particularly because the fast subsystem PCBB' did not receive a synchronization signal from the slower subsystem PCBA, the subsystem CBB' knows that it is the fastest one and that it has to slow down, as mentioned above.

It is to be noted that because the slowest subsystem PCBA has failed to generate a synchronization signal the fastest subsystem PCBB' then knows the processing frequency FL of this slower subsystem PCBA by the number of processor cycles executed. On the other hand the slowest subsystem PCBA does not know the processing frequency FH of the faster subsystem PCBB', it only knows that it is the slowest.

After the slowest subsystem PCBA has failed to generate the three requested processor cycles during the third bus clock cycle, then during the fourth bus clock cycle T4 both the subsystems PCBA and PCBB' only execute two processor cycles. As a result they are able to generate synchronization signals SA4 and SB4 respectively.

This number of two processor cycles will remain constant for all the following bus clock cycles T5, T6, . . . and the corresponding synchronisation signals SA5/SB5, SA6/SB6, . . . are sent and received by the partner subsystems.

It is to be noted that the subsystems PCBA and PCBB' are synchronized in frequency but not in phase. This is however not needed because the data on the system busses BA and BB are compared in the fault-tolerant processing system FTS at the rate of the relatively slow bus clock frequency Afterwards the second system bus BB is selected, thus enabling the operation of the processors PB1'and PB2' of the subsystem located on the printed circuit board PCBB'. The slow printed circuit board PCBA is then disabled, removed from the system FTS and replaced by another fast printed circuit board, say PCBA' (not shown), carrying a like named subsystem with the fast processors PA1' and PA2', i.e. running at the faster processing frequency FH.

The microsynchronization of the processors PA1'/PA2' running at the processing frequency FH with the processors PB1'PB2' running at the same processing frequency FH is realized as described above. The only difference is that, because the two subsystems PCBA' and PCBB' now run at the same high processing frequency FH, the moment at which they are no more able to generate a synchronization signal on the system busses BA and BB during a bus clock cycle will be the same for both these subsystems. As a result, they will slow down simultaneously.

From then onwards the operation of the two subsystems PCBA' and PCBB' is fully synchronized in frequency but not necessary in phase.

It is to be noted that when one of the subsystems PCBA/PCBA' or PCBB/PCBB' is out of service or when the two subsystems have the same processing frequency FL or FH, the fault-tolerant processing system FTS runs at its maximum speed, i.e. at this processing frequency FL or FH. Moreover, in the last case, anyone of the system busses BA or BB may be selected thus enabling the respective associated subsystem PCBA/PCBA' or PCBB/PCBB'.

In a variant of the described method, the fastest subsystem does not need to generate a synchronization signal because the slower subsystem will always be the first in failing to generate such a signal. However, in this case one has to know which subsystem is the slowest and which is the fastest. Moreover, after the two fast subsystems PCBA'/PCBB' have been put in place they are then no more exactly identical because at least one of them has to generate a synchronization signal for the reasons mentioned above.

While the principles of the invention have been described above in connection with specific apparatus, it is to be clearly understood that this description is made only by way of example and not as a limitation on the scope of the invention.

I claim:

1. Method for modifying a fault-tolerant processing system including a fair pair of processors and a second pair of processors operating in microsynchronization at a first processing frequency and respectively connected to first and second busses, both the busses operating under the control of a same bus clock signal having a same predetermined bus clock frequency substantially lower than said first processing frequency, said method comprising the steps of:

selecting said first bus for operation as a system bus;

while said first pair of processors is operating at said first processing frequency, replacing said second pair of processors by a third pair of processors operating at a second processing frequency different from said first processing frequency and substantially higher than said bus clock frequency;

after said third pair of processors is installed and operating at said second processing frequency, executing during an initial bus clock cycle of said bus clock signal a predetermined initial number of processor cycles both by said first pair of processors operating at said first processing frequency and connected to said first bus and by said third pair of processors operating at said second processing frequency and connected to said second bus;

generating a first synchronization signal after the first pair of processors has executed said predetermined initial number of processor cycles during said initial bus clock cycle;

generating a second synchronization signal after the second pair of processors has executed said predetermined initial number of processor cycles during said initial bus clock cycle; and increasing the system speed by executing during a following bus clock cycle by said first pair of processors operating at said first processing frequency, an increased number of processor cycles equal to the number of processor cycles executed during the preceding bus clock cycle increased by a predetermined increment of processor cycles and then generating another first synchronization signal, and executing during said following bus clock cycle by said third pair of processors operating at said second processing frequency, said increased number of processor cycles and then generating another second synchronization signal; and repeating the increasing step if said another first synchronization signal and said another second synchronization signal are both generated during said following bus clock cycle.

2. Method according to claim 1, wherein said first processing frequency is lower than said second processing frequency.

3. Method according to claim 1, wherein only said pair of processors operating at the lowest one amongst said first and said second processing frequencies generates a synchronization signal at the end of said bus clock cycle.

4. Method according to claim 1, wherein when either of said synchronization signals fails to be generated during a said following bus clock cycle, both said third and fourth sets of processors execute during another following bus clock cycle a number of processor cycles equal to said increased number of processor cycles decreased by one.

5. Method according to claim 1, wherein each of said synchronization signals is output to a respective said bus.

6. Method according to the claim 5, wherein each of said pairs of processors further comprises interface means connected to both said first and said second busses for detecting whether both said synchronization signals are output on their respective said busses and when a said synchronization signal is not output on its respective said bus during a bus clock cycle, both said pairs of processors execute during the following bus clock cycle a number of processor cycles equal to said increased number of processor cycles decreased by one.

7. Method according to claim 6, further comprising the step of comparing the results of the operation of each pair of processors with the results of the operations of a corresponding another pair of processors.

8. Method according to claim 1, wherein a said synchronization signal is generated at the end of said bus clock cycle.

9. Method according to claim 2, wherein each of said pairs of processors is able to generate a corresponding one of said synchronization signals.

10. Method according to claim 1, wherein said predetermined initial number of processor cycles is equal to one.

11. Method according to claim 1, wherein said predetermined increment of processor cycles is equal to one.

12. Method for modifying a fault-tolerant processing system including a first pair of processors and a second pair of processors operating in microsynchronization at a first processing frequency and respectively connected to first and second busses, both the busses operating under the control of a same bus clock signal having a same predetermined bus clock frequency substantially lower than said first processing frequency, said method comprising the steps:

selecting said first bus for operating as a system bus;

while said first pair of processors is operating at said first processing frequency, replacing said second pair of processors by a third pair of processors operating at a second processing frequency higher than said first processing frequency and substantially higher than said bus clock frequency;

after said third pair of processors is installed and operating at said second processing frequency, executing during an initial bus clock cycle of said bus clock signal a predetermined initial number of processor cycles both by said first pair of processors operating at said first processing frequency and connected to said first bus and by said third pair of processors operating at said second processing frequency and connected to said second bus;

selecting said second bus as said system bus;

replacing said first pair of processors by a fourth pair of processors operating at said second processing frequency; and executing during a second initial bus clock cycle of said bus clock signal a second same predetermined number of processor cycles by both said third and fourth processor pairs.

13. Method according to claim 12, further comprising the steps of:

generating a first synchronization signal after the fourth pair of processors has executed said second same predetermined number of processor cycles during said second initial bus clock cycle;

generating a second synchronization signal after the third pair of processors has executed said second same predetermined number of processor cycles during said second initial bus clock cycle; and increasing the system speed by executing during a following bus clock cycle by said fourth pair of processors, an increased number of processor cycles equal to the number of processor cycles executed during a preceding bus clock cycle increased by a predetermined increment of processor cycles and then generating another first synchronization signal, and executing during said following bus clock cycle by said third pair of processors, said increased number of processor cycles and then generating another second synchronization signal; and repeating the increasing step if said another first synchronization signal and said another second synchronization signal were both generated during said following bus clock cycle.

14. Method according to claim 13, wherein when either of said synchronization signals fails to be generated during a said following bus clock cycle, both said third and fourth pairs of processors execute during another following bus clock cycle a number of processor cycles equal to said increased number of processor cycles decreased by one.

15. Method according to claim 13, wherein each of said synchronization signals is output to a respective bus.

16. Method according to the claim 15, wherein
each of said pairs of processors further comprises interface means connected to both said first and said second busses for detecting whether both said synchronization signals are output on a respective one of said system busses and when a said synchronization signal is not output on its respective said bus during a bus clock cycle, both said pairs of processors execute during the following bus clock cycle a number of processor cycles equal to said increased number of processor cycles decreased by one.

17. Method according to claim 16, further comprising the step of comparing the results of the operation of each pair of processors with the results of the operations of a corresponding another pair of processors.

18. Method according to claim 13, wherein a said synchronization signal is generated at the end of said bus clock cycle.

19. Method according to claim 13, wherein each of said pairs of processors is able to generate a corresponding one of said synchronization signals.

20. Method according to claim 13, wherein said predetermined initial number of processor cycles is equal to one.

21. Method according to claim 13, wherein said predetermined increment of processor cycles is equal to one.

22. Method according to claim 12, wherein each of said pairs of processors comprises a plurality of processors operating in microsynchronization and performing simultaneously the same operations, and a respective checker means for comparing the results of said operations and for deactivating said each pair of processors when said results do not match, and said method further comprises the step of deactivating a pair of processors when the respective said results do not match.

* * * * *